United States Patent [19]

Fujioka

[11] 4,443,070

[45] Apr. 17, 1984

[54] CAMERA LENS SYSTEM WITH LONG BACK FOCAL DISTANCE AND LARGE APERTURE RATIO

[75] Inventor: Yoshisato Fujioka, Tokyo, Japan

[73] Assignee: Ricoh Col, Ltd., Japan

[21] Appl. No.: 328,505

[22] Filed: Dec. 8, 1981

Related U.S. Application Data

[63] Continuation-in-part of Ser. No. 41,624, May 23, 1979, abandoned.

[30] Foreign Application Priority Data

Jun. 5, 1978 [JP] Japan .................................. 53-66753

[51] Int. Cl.³ ............................................. G02B 9/62
[52] U.S. Cl. ..................................................... 350/464
[58] Field of Search ......................................... 350/464

[56] References Cited

U.S. PATENT DOCUMENTS 4,110,007 8/1978 Ikada .................................... 350/464
4,182,550 1/1980 Yamaguchi ......................... 350/464

FOREIGN PATENT DOCUMENTS 2506187 8/1975 Fed. Rep. of Germany ...... 350/464

Primary Examiner—John K. Corbin
Assistant Examiner—Scott J. Sugarman
Attorney, Agent, or Firm—McGlew and Tuttle

[57] ABSTRACT

A camera lens system is disclosed having a long back focal distance and a large aperture ratio. This enables the camera system to sufficiently correct for various aberrations including the spherical aberration of colors of the camera lens system.

2 Claims, 5 Drawing Figures

CAMERA LENS SYSTEM WITH LONG BACK FOCAL DISTANCE AND LARGE APERTURE RATIO

CROSS REFERENCE TO RELATED APPLICATION

This application is a continuation-in-part of application Ser. No. 041,624 filed May 23, 1979, now abandoned.

FIELD AND BACKGROUND OF THE INVENTION

The present invention relates to a camera lens with a long back focal distance and a large aperture ratio.

Conventionally, as the aperture ratio of the lens is increased, the back focal distance tends to become shorter. When an effort is made to maintain abberations in an acceptable range in the case of a Gaussian type lens having a 1:1.4 aperture ratio and an approximately 46° field angle, usually the back focal distance is about 60% of the focal length of the whole optical system of the lens. A method for improving aberrations while increasing the back focal distance is disclosed in Japanese patent publication No. 10083/1973. The publication discloses an invention capable of increasing the whole length of a lens up to 90% to 110% of the focal length of the whole optical system. However, the back focal distance of the lens only reaches 70% to 71% of the focal length of the whole optical system, so that the lens system tends to be oversized or the quantity of light in the peripheral portion of the lens tends to be reduced. Moreover, in order to prevent the increase of aberrations by making the lens small in size, it has been proposed to use glass having a high refractive index and a medium dispersion in a positive lens or a positive lens in a front group of lenses of a camera. A shortcoming of this method, however, is that correction of chromatic aberration cannot be done well.

Furthermore, in general, the back focal distance is decreased by increasing the aperture ratio of a lens. In the case of a Gauassian type lens having a 1:1.4 aperture ratio and an approximately 46° field angle, as the back focal distance increases beyond 60% of the focal length of the lens, various aberrations, including coma flare, become quite conspicuous so that correction of such aberrations becomes difficult.

SUMMARY OF THE INVENTION

It is therefore an object of the present invention to provide a lens system capable of overcoming the above-mentioned difficulty encountered in the conventional optical system and also capable of improving various aberrations including spherical aberration of color and a second spectrum.

According to the present invention, in spite of the fact that the aperture ratio of 1:1.4 and the field angle is 46° or more and the back focal distance reaches 73% or more of the focal length of the whole optical system, the aberrations including the spherical aberration with respect to each color are corrected sufficiently.

DETAILED DESCRIPTION OF PREFERRED EMBODIMENTS

Figure 1:
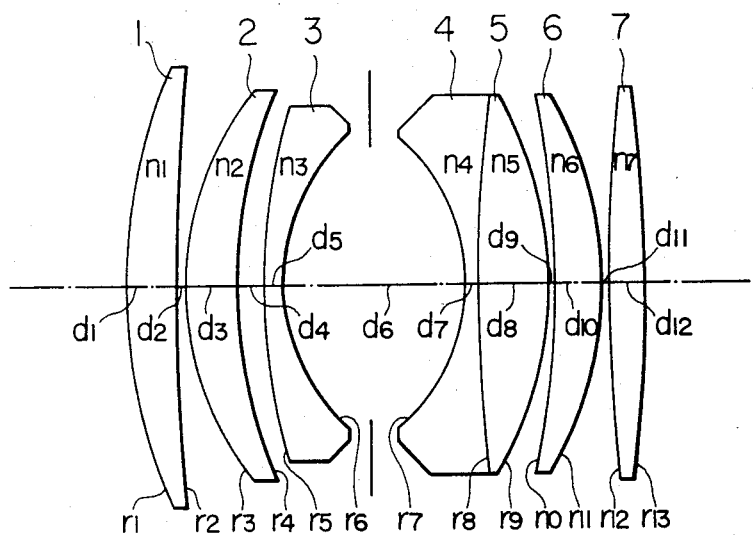
FIG. 1 is a sectional view of a lens system according to the present invention.
Figure 2:
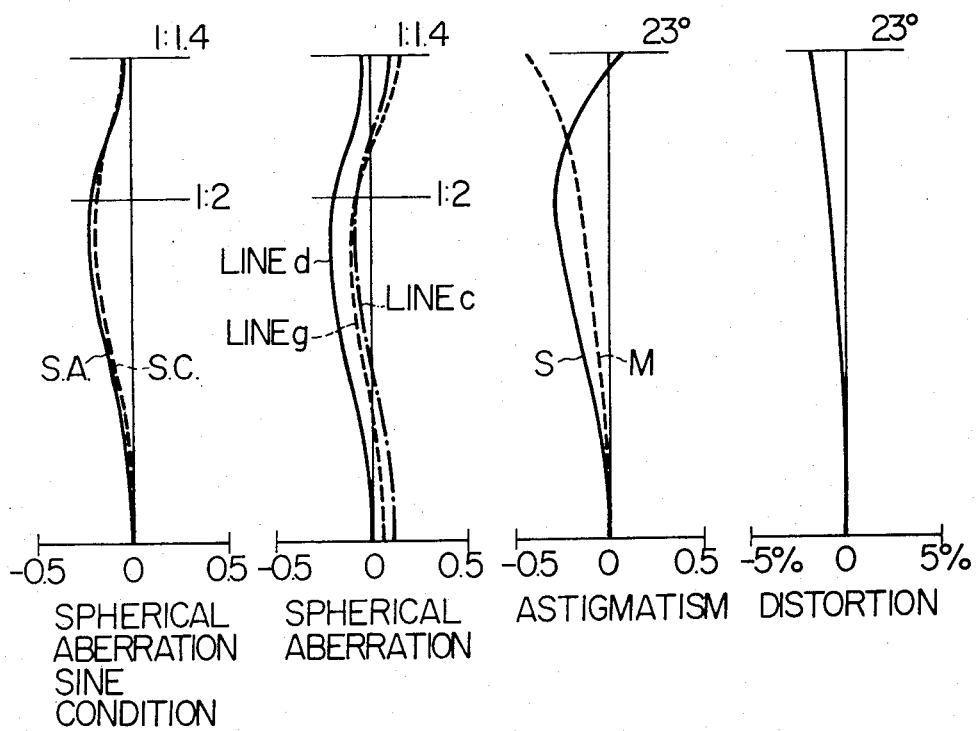
FIGS. 2 through 5 indicate the curves of the spherical aberration, sine condition, astigmatism, and distortion of each embodiment of a lens system according to the present invention.
Figure 3:
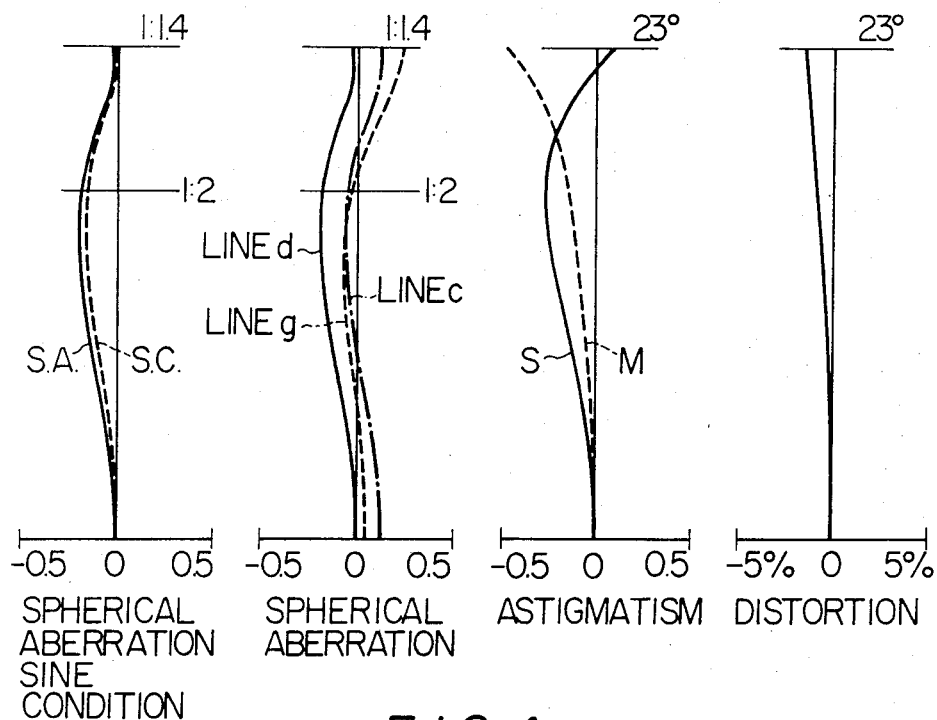
Figure 4:
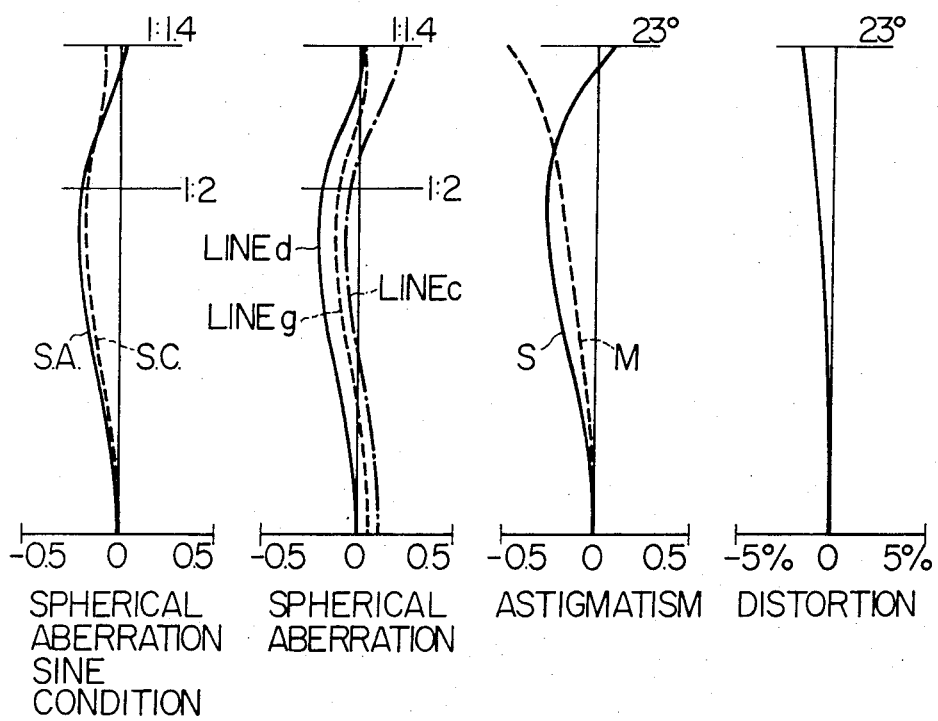
Figure 5:
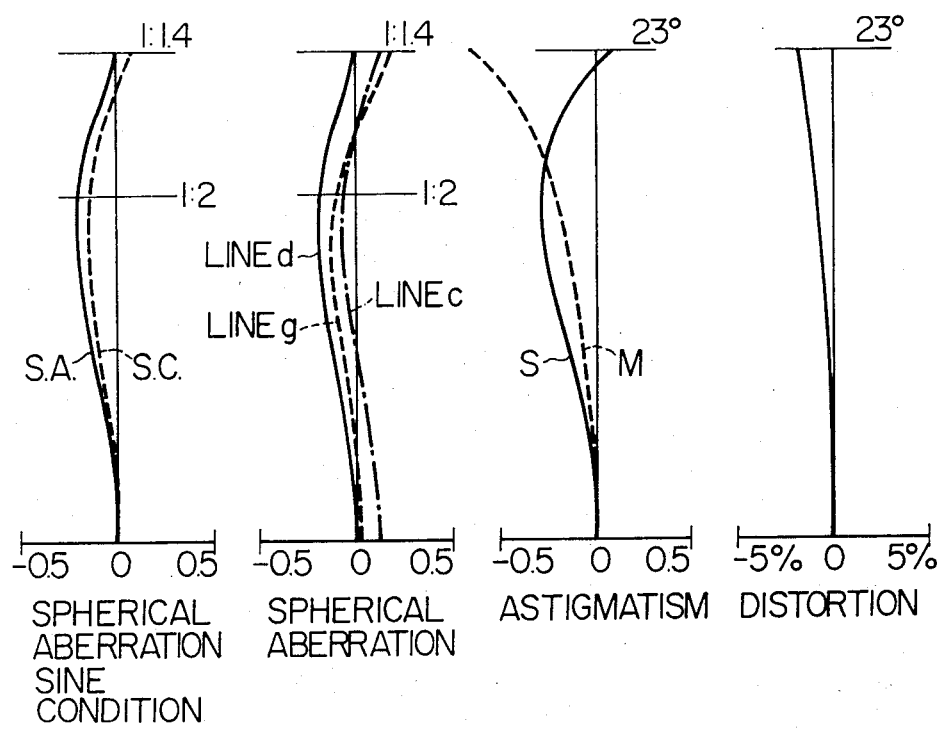

Referring to FIG. 1, there is shown a sectional view of a lens system according to the present invention, which comprises 7 single lenses, having 12 air surfaces. In the lens system, a first lens 1 and a second lens 2 are positive meniscus lenses with their convex surfaces directed towards an object to the left of the lens system. A third lens 3 is a negative meniscus lens whose convex surface is also directed towards the object. A fourth lens 4 is a negative lens and a fifth lens 5 is a positive lens connected to the fourth lens so that these two lenses constitute a negative meniscus lens, the convex surface of which is directed to an image to the right of the lens system. A sixth lens 6 is a positive meniscus lens whose convex surface is directed towards the image and a seventh lens 7 is a positive bi-convex lens. A diaphragm can be disposed between the third lens 3 and the negative meniscus lens consisting of the fourth lens 4 and the fifth lens 5. This lens system also satisfies the following conditions:

$$1.5 < r_1/r_3 < 2.2 \tag{1}$$

$$0.45f < f_3 < 0.52f \tag{2}$$

$$0.5f < |r_9| < 0.65f \tag{3}$$

$$0.9 < r_9/r_{11} < 1.1 \tag{4}$$

$$0.9 < r_6/|r_7| < 1.1 \tag{5}$$

$$0.27f < d_6 < (r_6 + |r_7|)/2 \tag{6}$$

$$-0.5 < f\left(\frac{1-n_2}{r_4} + \frac{n_3-1}{r_5}\right) < -0.2 \tag{7}$$

$$\frac{v_1 + v_2}{2} > 42, \frac{n_1 + n_2}{2} > 1.72 \tag{8}$$

$$0.8f < r_4 < 0.85f \tag{9}$$

where the focal length of the whole optical system is f, the radius of curvature of the respective surfaces of the lenses is $r_{2i-1}$ on the left and $r_{2i}$ on the right, respectively, the thickness of the lenses on the optical axis and the air gap between adjacent lenses is $d_i$ in order from left to right, the refractive index of the respective lenses 1–6 is $n_i$ and Abbe number of the respective lenses is $v_i$ (i=1, 2, 3, ... n, n is an integer).

In a known method for lengthening the back focal distance, the positive refracting power of a group of lenses in front of a diaphragm is weakened and the positive refracting power of another group of lenses behind the diaphragm is strengthened.

In another known method for the same purpose, the thickness of the lenses in front of the diaphragm and the air gap thereof are reduced.

In these methods, it is inevitable that the spherical aberration and the negative distortion become greater as the aperture ratio of the lens is increased, so that such aberrations cannot be corrected sufficiently. The above-mentioned conditions (1) and (2) in the present invention are for lengthening the back focal distance by setting a limitation to the sum and distribution of a positive refracting power of a group of lenses, which are convex towards an object and are disposed in front of the diaphragm and also for holding the balance of the sine condition appropriately by improving the spherical aberration. In the condition (1) $1.5 < r_1/r_3 < 2.2$, when $r_1/r_3$ becomes smaller than the lower limit, the back focal distance becomes too short to attain the object of the present invention and when $r_1/r_3$ becomes greater than the upper limit, the back focal distance is lengthened, but the spherical aberration remains too great. In the condition (2) of $0.45f < r_3 < 0.52f$, when $r_3$ becomes smaller than the lower limit, the spherical aberration becomes too great and the sine condition becomes too low.

On the other hand, when $r_3$ goes beyond the upper limit, the sine condition becomes too high. The conditions (3) and (4) are for improving the spherical aberration of a lens with a large aperture ratio, coma and distortion of the image surface by setting a limitation to the sum and distribution of the positive refractive power of a group of the meniscus lenses which are disposed behind the diaphragm and are convex towards the object. In the condition (3) of $0.5f < |r_9| < 0.65f$, when $|r_9|$ is reduced below the lower limit, aplanatism of the peripheral luminous flux on the optical axis which enters the sixth lens 6 is reduced so that the spherical aberration becomes greater. The sixth lens 6 is a positive meniscus lens which is convex towards the image. On the other hand, when $|r_9|$ exceeds the upper limit, the image surface inclines to the object side too much. The relationship of $0.9 < r_9/r_{11} < 1.1$ in the condition (4) is for determining the assignment of and distribution between $r_9$ and $r_{11}$ under the condition (3). When $r_9/r_{11}$ is reduced below the lower limit, the coma becomes excessive and when $r_9/r_{11}$ exceeds the upper limit, correction of the spherical aberration becomes considerably insufficient.

The conditions (5) and (6) are for determining the relationship between the distribution of refractive power of the surfaces of the third lens and fourth lens which face the diaphragm and the air gap between those lenses, and for improving coma and flatness of the image surface. In the condition (5) of $0.9 < r_6/r_7 < 1.1$, when $R_6/|r_7|$ is below the lower limit, the coma or the off-axis luminous flux which passes through the peripheral portion of the rear lenses becomes great. On the other hand, when $r_6/|r_7|$ is above the upper limit, the coma of the off-axis luminous flux which passes through the peripheral portion of the front lenses becomes great.

Moreover, as $r_6$ and $|r_7|$ decrease, the sum of their petzval decreases, so that the flatness of the image surface is improved, but the coma is reduced. As a countermeasure against this problem, a method of increasing the diaphragm gap $d_6$ is known. However, this method has shortcomings that the quantity of light in the peripheral portion of the lens is reduced and that the lens system becomes oversized. The condition (6) of $0.27f < d_6 < (r_6 + |r_7|)/2$ is for determining the relationship between $d_6$ and $r_6$ and $r_7$ so as to improve the coma without oversizing the lens system. When $d_6$ is smaller than the lower limit, it becomes impossible to correct the coma flare completely and when $d_6$ exceeds the upper limit, the quantity of light in the peripheral portion of the lens is decreased.

The condition (7) is for setting a negative range in the refractive power of the air lens between the second lens and the third lens. In the condition (7) of $$-0.5 < f\left(\frac{1-n_2}{r_4} + \frac{n_3-1}{r_5}\right) < -0.2 \text{ when}$$

$$f\left(\frac{1-n_2}{r_4} + \frac{n_3-1}{r_5}\right)$$

is smaller than the lower limit, the negative distortion and the coma flare becomes great when f $$\left(\frac{1-n_2}{r_4} + \frac{n_3-1}{r_5}\right)$$

exceeds the upper limit, correction of the spherical aberration becomes insufficient and the flatness of the image surface decreases.

The condition (8) is for improving the spherical aberration of color as well as the secondary spectrum. In order to correct the chromatic aberration, it is effective to reduce the occurrence of the chromatic aberration near the front lenses and it is preferable to use glass with less dispersion in the first lens 1 and the second lens 2. In order to improve the spherical aberration of color, it is effective to reduce the occurrence of the spherical aberration near the front lenses. In order to do this, it is necessary to reduce the load of curvature by use of glass having a high refractive index in the first lens 1 and the second lens 2.

In the condition (8) of $(v_1 + v_2)/2 < 42$, when $(v_1 + v_2)/2$ is out of this range, correction of the chromatic aberration cannot be performed sufficiently and even if $(v_1 + v_2)/2$ is in the range, when $(n_1 + n_2)/2$ is out of the range of $(n_1 + n_2)/2 < 1.72$, the spherical aberration of color increases. Moreover, when glass with $n > 1.73$ and $v > 44$ is used in at least one lens of the first lens and the second lens, I have discovered that the secondary spectrum can be improved by the difference between the characteristics of partial dispersion of the glass.

Condition (9) places constraints on the radius $r_4$. Condition (9) permits the lens system to have longer backfocus and excellent aberration. When $r_4$ is below the lower limit, the positive refraction of the second lens becomes weaker and the divergent aberration is increased. When $r_4$ exceeds the upper limit the positive refraction of the second lens becomes stronger and the convergent aberration is increased.

The following are the embodiments of the camera lenses according to the present invention, with embodiments 2 and 4 being preferred.

EMBODIMENT 1:

| | f = 100, Aperture ratio 1:1.4 Field angle 46°, Back focal distance 73.78 | | | |
|---|---|---|---|---|
| $r_1 = 88.811$ | | | | |
| | $d_1 = 8.73$ | $n_1 = 1.77250$ | $v_1 = 49.62$ | |
| $r_2 = 468.027$ | | | | |
| | $d_2 = 0.21$ | | | |
| $r_3 = 48.472$ | | | | |
| | $d_3 = 9.23$ | $n_2 = 1.74400$ | $v_2 = 44.87$ | |
| $r_4 = 77.060$ | | | | |
| | $d_4 = 4.91$ | | | |
| $r_5 = 104.392$ | | | | |
| | $d_5 = 3.03$ | $n_3 = 1.68893$ | $v_3 = 31.16$ | |
| $r_6 = 32.532$ | | | | |
| | $d_6 = 29.77$ | | | |

-continued

| f = 100, Aperture ratio 1:1.4 Field angle 46°, Back focal distance 73.78 | | | |
|---|---|---|---|
| $r_7 = 32.861$ | | | |
| | $d_7 = 2.04$ | $n_4 = 1.75520$ | $\nu_4 = 27.53$ |
| $r_8 = 277.302$ | | | |
| | $d_8 = 12.84$ | $n_5 = 1.80610$ | $\nu_5 = 40.74$ |
| $r_9 = -56.417$ | | | |
| | $d_9 = 0.21$ | | |
| $r_{10} = -152.163$ | | | |
| | $d_{10} = 8.24$ | $n_6 = 1.80420$ | $\nu_6 = 46.50$ |
| $r_{11} = -58.550$ | | | |
| | $d_{11} = 0.19$ | | |
| $r_{12} = 290.780$ | | | |
| | $d_{12} = 6.21$ | $n_7 = 1.72000$ | $\nu_7 = 50.34$ |
| $r_{13} = -210.359$ | | | |

EMBODIMENT 2:

| f = 100, Aperture ratio 1:1.4 Field angle 46°, Back focal distance 73.79 | | | |
|---|---|---|---|
| $r_1 = 96.872$ | | | |
| | $d_1 = 8.24$ | $n_1 = 1.77250$ | $\nu_1 = 49.62$ |
| $r_2 = 628.489$ | | | |
| | $d_2 = 0.23$ | | |
| $r_3 = 48.086$ | | | |
| | $d_3 = 8.65$ | $n_2 = 1.74400$ | $\nu_2 = 44.87$ |
| $r_4 = 81.938$ | | | |
| | $d_4 = 4.95$ | | |
| $r_5 = 114.699$ | | | |
| | $d_5 = 3.88$ | $n_3 = 1.68893$ | $\nu_3 = 31.16$ |
| $r_6 = 32.911$ | | | |
| | $d_6 = 29.54$ | | |
| $r_7 = -33.157$ | | | |
| | $d_7 = 2.33$ | $n_4 = 1.74077$ | $\nu_4 = 27.76$ |
| $r_8 = 277.242$ | | | |
| | $d_8 = 12.47$ | $n_5 = 1.80610$ | $\nu_5 = 40.74$ |
| $r_9 = -56.432$ | | | |
| | $d_9 = 0.23$ | | |
| $r_{10} = -137.843$ | | | |
| | $d_{10} = 7.62$ | $n_6 = 1.80420$ | $\nu_5 = 46.50$ |
| $r_{11} = -58.269$ | | | |
| | $d_{11} = 0.19$ | | |
| $r_{12} = 269.964$ | | | |
| | $d_{12} = 6.05$ | $n_7 = 1.72000$ | $\nu_7 = 50.34$ |
| $r_{13} = -221.116$ | | | |

EMBODIMENT 3:

| f = 100, Aperture ratio 1:1.4 Field angle 46°, Back focal distance 73.78 | | | |
|---|---|---|---|
| $r_1 = 82.446$ | | | |
| | $d_1 = 8.70$ | $n_1 = 1.77250$ | $\nu_1 = 49.62$ |
| $r_2 = 409.300$ | | | |
| | $d_2 = 0.19$ | | |
| $r_3 = 48.953$ | | | |
| | $d_3 = 9.14$ | $n_2 = 1.74400$ | $\nu_2 = 44.87$ |
| $r_4 = 75.402$ | | | |
| | $d_4 = 4.90$ | | |
| $r_5 = 104.732$ | | | |
| | $d_5 = 3.04$ | $n_3 = 1.68893$ | $\nu_3 = 31.16$ |
| $r_6 = 32.160$ | | | |
| | $d_6 = 29.97$ | | |
| $r_7 = -31.920$ | | | |
| | $d_7 = 2.23$ | $n_4 = 1.76182$ | $\nu_4 = 26.55$ |
| $r_8 = -1008.805$ | | | |
| | $d_8 = 11.62$ | $n_5 = 1.80610$ | $\nu_5 = 40.74$ |
| $r_9 = -56.039$ | | | |
| | $d_9 = 0.19$ | | |
| $r_{10} = -148.569$ | | | |
| | $d_{10} = 8.52$ | $n_6 = 1.80420$ | $\nu_6 = 46.50$ |
| $r_{11} = -55.766$ | | | |
| | $d_{11} = 0.19$ | | |
| $r_{12} = 342.018$ | | | |
| | $d_{12} = 6.32$ | $n_7 = 1.72000$ | $\nu_7 = 50.34$ |
| $r_{13} = -175.061$ | | | |

EMBODIMENT 4:

| f = 100, Aperture ratio 1:1.4 Field angle 46°, Back focal distance 73.90 | | | |
|---|---|---|---|
| $r_1 = 92.414$ | | | |
| | $d_1 = 9.76$ | $n_1 = 1.74400$ | $\nu_1 = 44.87$ |
| $r_2 = 749.101$ | | | |
| | $d_2 = 0.79$ | | |
| $r_3 = 49.938$ | | | |
| | $d_3 = 8.44$ | $n_2 = 1.77250$ | $\nu_2 = 49.62$ |
| $r_4 = 83.723$ | | | |
| | $d_4 = 4.08$ | | |
| $r_5 = 128.501$ | | | |
| | $d_5 = 4.68$ | $n_3 = 1.68893$ | $\nu_3 = 31.16$ |
| $r_6 = 33.813$ | | | |
| | $d_6 = 28.14$ | | |
| $r_7 = -34.628$ | | | |
| | $d_7 = 2.38$ | $n_4 = 1.75520$ | $\nu_4 = 27.53$ |
| $r_8 = 193.313$ | | | |
| | $d_8 = 13.83$ | $n_5 = 1.80610$ | $\nu_5 = 40.74$ |
| $r_9 = -61.123$ | | | |
| | $d_9 = 0.20$ | | |
| $r_{10} = -164.000$ | | | |
| | $d_{10} = 7.43$ | $n_6 = 1.80420$ | $\nu_6 = 46.50$ |
| $r_{11} = -62.441$ | | | |
| | $d_{11} = 0.19$ | | |
| $r_{12} = 321.131$ | | | |
| | $d_{12} = 6.33$ | $n_7 = 1.74400$ | $\nu_7 = 44.87$ |
| $r_{13} = -184.115$ | | | |

Referring to FIGS. 2 through 5, there are shown the aberration curves of the above-mentioned embodiments according to the present invention. The length of the lens is not more than 0.87 f and the back focal distance is long and the aperture ratio is great. In spite of such lenses, the aberrations are corrected sufficiently and the spherical aberration with respect to each color is acceptable.

In FIGS. 2 through 5 S.A. represents spherical aberration and S.C. the saggital image surface and M the meridional image surface.

What is claimed is:

1. A lens system with a long back focal distance and a great aperture ratio, comprising first through seventh single lens elements and having twelve air instant surfaces, of which the first and second lens elements are positive meniscus lenses whose convex surfaces are directed towards an object, the third lens element is a negative meniscus lens whose convex surface is directed towards the object, the fourth lens element is a negative lens, the fifth lens element is a positive lens, said fourth lens element and said fifth lens element being connected with each other and constituting a negative meniscus lens whose convex surface is directed towards an image, the sixth lens element is a positive meniscus lens whose convex surface is directed towards said image, and the seventh lens element is a positive biconvex lens, where the radius of curvature of each of the two surfaces of each lens element i, where $1 < i < 7$, starting at the object side of the lens system is $r_{2i-1}$ and $r_{2i}$, respectively, and the thickness of each said lens element on the optical axis thereof and the air gap between each pair of said lens element is $d_i$, in order, and the refractive index of each of said lens elements is $n_i$ and Abbe number of each of said lens elements is $\nu_i$, where i = 1, 2, 3 . . . m;

n is an integer, and wherein, with f=100 and an aperture ratio of 1:1.14, a field angle of 46° and a back focal distance of 73.79, the following conditions are met:

| | | | |
|---|---|---|---|
| $r_1 = 96.872$ | | | |
| | $d_1 = 8.42$ | $n_1 = 1.77250$ | $\nu_1 = 49.62$ |
| $r_2 = 628.489$ | | | |
| | $d_2 = 0.23$ | | |
| $r_3 = 48.086$ | | | |
| | $d_3 = 8.65$ | $n_2 = 1.74400$ | $\nu_2 = 44.87$ |
| $r_4 = 81.938$ | | | |
| | $d_4 = 4.95$ | | |
| $r_5 = 114.699$ | | | |
| | $d_5 = 3.88$ | $n_3 = 1.68893$ | $\nu_3 = 31.16$ |
| $r_6 = 32.911$ | | | |
| | $d_6 = 29.54$ | | |
| $r_7 = -33.157$ | | | |
| | $d_7 = 2.33$ | $n_4 = 1.74007$ | $\nu_4 = 27.76$ |
| $r_8 = 277.242$ | | | |
| | $d_8 = 12.47$ | $n_5 = 1.80610$ | $\nu_5 = 40.74$ |
| $r_9 = -56.432$ | | | |
| | $d_9 = 0.23$ | | |
| $r_{10} = -137.843$ | | | |
| | $d_{10} = 7.62$ | $n_6 = 1.80420$ | $\nu_6 = 46.50$ |
| $r_{11} = -58.269$ | | | |
| | $d_{11} = 0.19$ | | |
| $r_{12} = 269.964$ | | | |
| | $d_{12} = 6.05$ | $n_7 = 1.72000$ | $\nu_7 = 50.34$ |
| $r_{13} = -221.116$ | | | |

2. A lens system with a long back focal distance and a great aperture ratio, comprising first through seventh single lens elements and having 12 air contact surfaces, of which the first and second lens elements are positive meniscus lenses whose convex surfaces are directed towards an object, the third lens element is a negative meniscus lens whose convex surface is directed towards the object, the fourth lens element is a negative lens, the fifth lens element is a positive lens, said fourth lens element and said fifth lens element being connected with each other and constituting a negative meniscus lens whose convex surface is directed towards an image, the sixth lens element is a positive meniscus lens whose convex surface is directed towards said image, and the seventh lens element is a positive biconvex lens, where the radius of curvature of each of the two surfaces of each lens element i, where $1 < i < 7$, starting at the object side of the lens system is $r_{2i-1}$ and $r_{2i}$, respectively, and the thickness of each said lens element on the optical axis thereof and the air gap between each pair of said lens element is $d_i$, in order, and the refractive index of each of said lens elements is $n_i$ and Abbe number of each of said lens elements is $\nu_1$, where i=1, 2, 3 ... m; n is an integer, and wherein with f=100 and an aperture ratio of 1:1.4, a field angle of 46° and a back focal distance of 73.90, the following conditions are met:

| | | | |
|---|---|---|---|
| $r_1 = 92.414$ | | | |
| | $d_1 = 9.76$ | $n_1 = 1.74400$ | $\nu_1 = 44.87$ |
| $r_2 = 749.101$ | | | |
| | $d_2 = 0.79$ | | |
| $r_3 = 49.938$ | | | |
| | $d_3 = 8.44$ | $n_2 = 1.77250$ | $\nu_2 = 49.62$ |
| $r_4 = 83.723$ | | | |
| | $d_4 = 4.08$ | | |
| $r_5 = 128.501$ | | | |
| | $d_5 = 4.68$ | $n_3 = 1.68893$ | $\nu_3 = 31.16$ |
| $r_6 = 33.813$ | | | |
| | $d_6 = 28.14$ | | |
| $r_7 = -34.628$ | | | |
| | $d_7 = 2.38$ | $n_4 = 1.75520$ | $\nu_4 = 27.53$ |
| $r_8 = 193.313$ | | | |
| | $d_8 = 13.83$ | $n_5 = 1.80610$ | $\nu_5 = 40.74$ |
| $r_9 = -61.123$ | | | |
| | $d_9 = 0.20$ | | |
| $r_{10} = -164.000$ | | | |
| | $d_{10} = 7.43$ | $n_6 = 1.80420$ | $\nu_6 = 46.50$ |
| $r_{11} = -62.441$ | | | |
| | $d_{11} = 0.19$ | | |
| $r_{12} = 321.131$ | | | |
| | $d_{12} = 6.33$ | $n_7 = 1.74400$ | $\nu_7 = 44.87$ |
| $r_{13} = -184.115$ | | | |

* * * * *